(12) United States Patent
Miller

(10) Patent No.: US 7,914,226 B2
(45) Date of Patent: Mar. 29, 2011

(54) NON-REMOVABLE SAFETY PIN

(75) Inventor: Gary Miller, Tyne & Wear (GB)

(73) Assignee: Miller UK Limited, Northumberland (GB)

( * ) Notice: Subject to any disclaimer, the term of this patent is extended or adjusted under 35 U.S.C. 154(b) by 538 days.

(21) Appl. No.: 11/349,491

(22) Filed: Feb. 7, 2006

(65) Prior Publication Data

US 2007/0039213 A1   Feb. 22, 2007

(30) Foreign Application Priority Data

Aug. 17, 2005   (GB) .................................. 3022197

(51) Int. Cl.
 *B25G 3/18*   (2006.01)
 *F16B 21/00*  (2006.01)
 *F16D 1/00*   (2006.01)
(52) U.S. Cl. .......... 403/324; 403/154; 403/316; 37/468; 292/150
(58) Field of Classification Search .................. 292/150, 292/155, 300, 302; 403/150, 154, 155, 157, 403/315, 316, 319, 324; 411/351, 417; 37/355, 37/356, 468
 See application file for complete search history.

(56) References Cited

U.S. PATENT DOCUMENTS

| 166,379 | A | * | 8/1875 | Hipkins et al. ................ 238/252 |
| 355,980 | A | * | 1/1887 | Dimon ........................... 278/96 |
| 566,130 | A | * | 8/1896 | Bowers ......................... 411/351 |
| 1,376,945 | A | * | 5/1921 | Kristofek ....................... 40/121 |
| 2,382,166 | A | * | 8/1945 | Martin ........................... 411/347 |
| 2,588,018 | A | * | 3/1952 | Lauenstein ................... 267/154 |
| 3,223,201 | A | * | 12/1965 | Waner ............................. 188/67 |
| 3,869,877 | A | * | 3/1975 | Brahler .......................... 464/97 |
| 3,875,360 | A | * | 4/1975 | Rys ............................... 200/400 |
| 4,030,694 | A | * | 6/1977 | Schimmel ..................... 249/196 |
| 4,337,614 | A | * | 7/1982 | Briscoe ............................ 59/86 |
| 5,630,673 | A | * | 5/1997 | Krzywanos et al. .......... 403/158 |
| 6,168,342 | B1 | * | 1/2001 | Wu ................................ 403/119 |
| 6,308,442 | B1 |   | 10/2001 | Naka et al. |
| 6,309,131 | B1 | * | 10/2001 | Dawson ......................... 403/79 |
| 6,309,311 | B1 | * | 10/2001 | Lu ................................ 473/332 |
| 6,312,212 | B1 | * | 11/2001 | Burlew, Jr. ................... 414/723 |
| 6,350,079 | B1 | * | 2/2002 | Williams ...................... 403/326 |
| 6,379,075 | B1 | * | 4/2002 | Shamblin et al. .......... 403/322.1 |
| 6,431,785 | B1 |   | 8/2002 | Melander |
| 6,537,006 | B1 | * | 3/2003 | Clark .............................. 411/82 |
| 6,877,259 | B2 | * | 4/2005 | Nishimura et al. ............. 37/468 |
| 2004/0060210 | A1 |   | 4/2004 | Nishimura et al. |

FOREIGN PATENT DOCUMENTS

| GB | 0420152.1 | 2/1933 |
| GB | 357748 A  | 8/1981 |
| GB | 2256631 A | 12/1992 |
| GB | 2335907 A | 5/1999 |

* cited by examiner

*Primary Examiner* — Daniel P Stodola
*Assistant Examiner* — Nahid Amiri
(74) *Attorney, Agent, or Firm* — Stephen B. Salai, Esq.; Michael J. Didas, Esq.; Harter Secrest & Emery LLP

(57) ABSTRACT

A non-removable safety pin (20) for an excavator coupler for securing a latching hook thereof. The safety pin (20) comprises a head (26), a shaft (24), a distal end (22) and a longitudinal axis starting at the head (26), extending along the shaft (24) and terminating at the distal end (22), wherein either or both of the shaft (24) and the distal end (22) are keyed so as to have an element thereon that extends relative to a side of the shaft. The element prevents removal of the safety pin from a hole (36) in which the safety pin (20) is inserted.

12 Claims, 5 Drawing Sheets

NON-REMOVABLE SAFETY PIN

RELATED APPLICATION

This application is related to U.K. Design Patent Application GB3022197, filed Aug. 17, 2005.

FIELD OF INVENTION

The present invention relates to a non-removable safety pin, for example for use to secure the engagement of pivoting or sliding latching hooks, or other moving elements, in a bucket or accessory coupler for an excavator. Such couplers may be for coupling a bucket, or some other accessory, to an excavator arm of an excavator.

BACKGROUND

It is well known in the art of excavators to provide a coupler between an end of an excavator arm of the excavator and an accessory for that excavator, such as digging buckets for that excavator. Couplers are generally mounted to the arm of the excavator with coupler pins. Then, for coupling a bucket thereto, at the bottom of the coupler, a fixed pair of hooks and either a pair pivoting latching hooks or sliding latching hooks is provided. The hooks engage bucket (or accessory) pins, which are generally provided at the top of the bucket (accessory).

The pivoting or sliding latching hooks are moveable to allow the coupler to both secure and release an accessory to and from the arm of the excavator mechanically, e.g. at the control of a button, using hydraulics or a screw-drive. Generally, however, the hook will be hydraulically actuateable from within the cab of the excavator for remotely securing and releasing the accessory.

It has become increasingly common to provide a safety pin for engaging behind the movable latching hooks (when they are in their latched position), by passing it through the side plates of the coupler, to prevent the hooks from moving backwards, i.e. away from the latched position, in the event of a hydraulic failure. Indeed, this safety feature has become mandatory in some countries. However, because the safety pin has to be inserted manually, in practice it is found that many excavator operators either forget to use it or simply refuse to use it. This presents a significant health and safety risk both to the operator and to those around the excavator.

BRIEF SUMMARY OF INVENTION

The present invention, therefore, seeks to provide a safety pin that will help to stop such behaviour, i.e. to prevent operators from not using a safety pin.

The present invention provides a safety pin comprising a head, a shaft, a distal end and a longitudinal axis starting at the head, extending along the shaft and terminating at the distal end, wherein either or both of the shaft and the distal end are keyed so as to have an element thereon that extends outward relative to a side of the shaft.

Preferably the element extends in a direction that is generally perpendicular to the longitudinal axis of the safety pin.

Preferably the element extends radially outward from the rest of the shaft and the distal end.

Preferably the head extends radially outward from the side of the shaft. Preferably it extends by a similar amount as the element.

The element may be a complete ring of material, or a substantially complete ring of material.

There may be more than one element.

The element may be formed by stamping the distal end to flatten and widen it.

The distal end may be integral with the shaft.

The distal end may be a separately formed component attached to the end of the shaft.

Preferably the shaft is substantially cylindrical. However, it might not be fully cylindrical. For example, it may have one, two, three or more flat sides or faces or it may be semi-cylindrical, i.e. having a semi-circular cross section.

If the shaft has one or more flat sides or faces, preferably the or each flat side or face extends longitudinally along substantially the whole length of the shaft.

Preferably the shaft has more than one side. Preferably there are two or more sides that are positioned at different radial distances away from the longitudinal axis of the safety pin. This allows the pin to be rotated, in use, to provide alternative safety positions. For example, with a coupler for an excavator, not all manufacturers provide the same size bucket (or accessory) pins or the same centre-to-centre pin spacings (collectively, multiple pin spacings). Therefore, once the coupler's hooks have engaged the pins, the safety pin can be fitted in a most appropriate orientation by rotating the safety pin to face the most appropriately distanced side towards the latching hook. This feature, therefore, provides a capability for managing multiple pin spacings.

The distal end of the safety pin may be substantially cylindrical. However, it may have steps therein, and/or perhaps flat sides or faces.

The distal end of the safety pin preferably has a hole therein. The hole preferably extends transversely through the safety pin for receiving a lynch pin or R-clip for locking the safety pin in an inserted position, as known in the art of safety pins.

Preferably the distal tip of the distal end of the safety pin is tapered to assist with the insertion of the safety pin into holes.

Preferably the key is in the form of a shoulder between the distal tip of the safety pin and the shaft. Preferably the shoulder is at the juncture between the distal end and the shaft.

The keyed element provides the safety pin with the means for necessitating at least one of the following:

the correct orientation of the safety pin for removal from a hole in which it has been inserted;

the deformation of or the alteration of the size or shape of the hole for removing the safety pin from the hole;

the deformation of the safety pin, the shaft, the distal end or the element for removing the safety pin from the hole; or the alteration of the shape or form of the safety pin, for example by disassembly or breakage of the safety pin, for removing the safety pin from the hole.

Preferably the element extends radially outward beyond all of the shaft's circumferential surface.

The element may be rigidly fixed in its position. Alternatively it may be retractable, rotatable or otherwise moveable or deformable from the position in which it blocks the safety pin's removal from a hole.

Preferably the head comprises a flange for assisting in gripping of the safety pin for helping in the retraction of the safety pin from a safe or inserted position to a non-safe or retracted position.

Preferably the head is non circular, or it provides a grip by some other means, to assist with turning of the pin about its longitudinal axis.

The present invention also provides a hole for receiving a safety pin, for example in a coupler for an excavator, in combination with a safety pin as described above.

Preferably the hole for receiving the safety pin is sized to allow the shaft (and/or distal end) to slide through the hole up to the point where the projecting or outwardly extending element is. Therefore, the safety pin will not pass all the way through the hole.

Preferably the shape or size of the hole is defined, at least in part, by a plate.

Preferably the plate is removable. Preferably, by removing the plate, the size of the hole is altered. Preferably the altered size allows the shaft, the distal end and projecting or outwardly extending element to pass through the hole. This allows the safety pin to be removed so that it becomes a serviceable part.

Preferably the plate is screwed or bolted over a portion of the hole.

Preferably the plate covers a sector of the hole.

The hole is preferably in a side plate of a coupler for an excavator arm.

Preferably there is also an opposing hole, which may be in axial alignment with the first hole. Preferably the opposing hole is in an opposite side plate of a coupler. Preferably the opposing hole is sized or shaped to receive the distal end of the safety pin.

Preferably the opposing hole is a through hole. Preferably the safety pin, in its inserted position, extends out beyond the far side of the opposing hole.

Preferably the safety pin is of a length to pass through the first hole and to extend to the opposing hole to allow a safety pin securement device to secure the safety pin in its safe or inserted position.

Preferably a safety pin securement device is provided. Preferably the safety pin securement device comprises a hole in the distal end and a lynch pin or R-clip for locking the safety pin in an inserted position, as known in the art of safety pins.

The safety pin may comprise a substantially semi-cylindrical shaft with a substantially cylindrical distal end having a substantially semi-circular shaped shoulder therebetween. Preferably the hole is then a substantially round hole that slidably receives the safety pin, and there is a removable locking plate provided over the hole to close a sector of the substantially round hole for slidably locking the safety pin in the hole. Preferably the sector is substantially a semi-circle, corresponding to, or slightly less full or smaller than, the shoulder. In this manner the safety pin cannot be removed from the hole without removing the plate. The shoulder provides the keyed element that extends outward relative to the flat side of the semi-cylindrical shaft.

In an alternative embodiment, the safety pin comprises a cylindrical shaft and a keyed distal end, wherein the keyed distal end comprises a flattened portion having a wider width than the diameter of the shaft, and the head comprises a removable element having a larger size than the diameter of the shaft. In use, the pin is inserted first through an opposing hole without the head attached thereto by inserting the shaft through the hole, and then through the first hole, and once in place, the head is then attached to the shaft to lock the safety pin in the hole. Only by removing the head will the safety pin then be removable from the holes for servicing.

The present invention also provides a hole for receiving a safety pin, for example in a coupler for an excavator, in combination with a safety pin comprising a head, a shaft, a distal end and a longitudinal axis starting at the head, extending along the shaft and terminating at the distal end, wherein either or both of the shaft and the distal end are keyed so as to have an element thereon that extends inward relative to a side of the shaft, wherein the hole comprises means for engaging into the element for preventing removal of the safety pin from the hole if the safety pin is retracted or otherwise put into a position in which the element aligns with the means for engaging.

Preferably the means for engaging is a sprung element.

Preferably the element has a ramped edge to allow the safety pin to be reinserted from the retracted position, the means for engaging riding out of the element over the ramped edge.

Preferably the means for engaging is part of a removable plate.

The present invention also provides a coupler having a pivoting or sliding latching hook and at least one hole for receiving a safety pin for sliding behind the hook once the hook has been engaged with a bucket pin or an accessory pin, the coupler additionally comprising a safety pin, wherein the safety pin or the hole in combination with the safety pin is as defined above.

The coupler, at the hole for receiving the safety pin, may comprise a locking plate. This locking plate may be welded in place to permanently lock the safety pin into the coupler. Alternatively, the locking plate may be removably fastened to the coupler at the hole, for example, by two bolts. This allows the locking plate to be removed for removal of the safety pin, for example for servicing purposes.

With the present invention, because the safety pin cannot be easily removed from its hole, the chances of an operator removing and then losing the pin are substantially reduced. Further, the pin, when retracted to a non-safe position, is likely to be visible to the operator to remind him to re-insert it into the safety position. In this regard, the safety pin may advantageously be provided in a bright colour to help make it stand out.

BRIEF DESCRIPTION OF THE DRAWINGS

The present invention will now be described by way of example only with reference to the accompanying drawings in which.

DETAILED DESCRIPTION OF THE INVENTION

Figure 1:
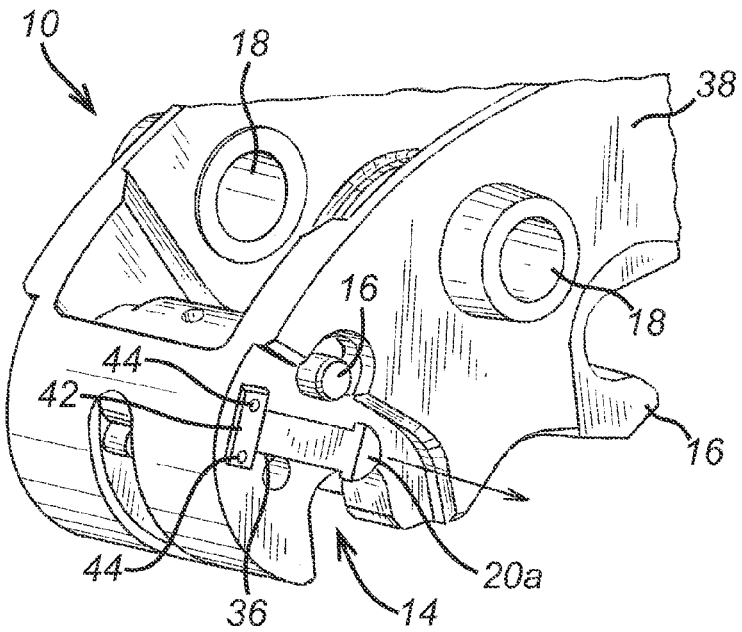
FIG. 1 shows a safety pin of the first embodiment fitted to a coupler.

Referring first to FIG. 1, there is shown a coupler 10 having a pair of rear hooks 12 (one shown), a pair of front pin receiving slots 14, a pair of pivoting latching hooks (not shown, but pivotal about hook pivot pin 16), two pairs of coupler pin receiving holes 18 (one pair shown) and a safety pin 20*a*.

In use, coupler pins (not shown) will be used to mount the coupler 10 to an end of an excavator arm of an excavator (not shown). The safety pin 20*a* would then be pulled out of its inserted position into a non-safe position (see, for example, FIGS. 5, 8 or 9). Then, the rear hooks 12 and the latching hooks would be used to attach the coupler 10 to an accessory, such as a bucket (not shown), as known in the art. See, for example, FIGS. 1 and 2 of GB2359062. In the prior art, however, the safety pin would be fully removed.

Once the latching hook has been advanced into its engaged or latched position, the safety pin 20*a* would then be reinserted into the safe position to prevent the latching hook from being able to retract or disengage from the latched position.

To release the bucket, the safety pin 20*a* is again retracted to its non-safe position and the latching hook is retracted to a non-latched position. Then the rear hooks 12 can be disengaged.

Figure 2:
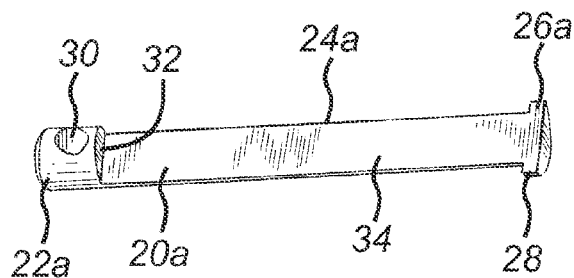
FIG. 2 is a perspective view of the safety pin of FIG. 1.

Referring now to FIG. 2, the safety pin 20*a* comprises a distal end 22*a*, a shaft 24*a*, and a head 26*a*. These are linearly arranged along a longitudinal axis of the safety pin 20*a*. The distal end 22*a* is generally cylindrical. The shaft 24*a* is generally semi-cylindrical. The head 26*a* comprises a flange extending radially outward relative to the shaft.

A transverse hole 30 is provided in the distal end. It is sized to receive a lynch pin or an R-clip (not shown).

The juncture between the cylindrical distal end 22*a* and the shaft 24*a* defines a semi-circular shoulder 32*a*. It extends perpendicular to the longitudinal axis of the safety pin 20*a*.

The head 26*a*, the shaft 24*a* and the distal end 22*a* are all integrally formed as a single piece.

The semi-circular shaft 24*a* has a flat surface 34. In use, the flat surface 34 will usually face the rear side of the latching hook.

The safety pin can be cast into the above shape. It might alternatively be ground into that shape from a conventional safety pin.

Referring again to FIG. 1, the safety pin 20*a* is fitted into a hole 36 in a side plate 38 of the coupler 10 (the side plates of couplers are not necessarily flat, and are not necessarily formed from a plate—some couplers are cast and then ground/milled to a final shape).

The hole 36 is sized for receiving the shaft 24*a* of the safety pin 20 with a sliding fit. However, the head 26*a* of the safety pin 20*a* is too big to pass through the hole 36.

An opposing hole (not shown) in the opposite side plate is also provided. The opposing hole is sized for receiving the distal end 22*a* of the safety pin 20*a* with a sliding fit.

Upon inserting the safety pin 20*a* into its safe position, the distal end 22*a* of the safety pin will extend into the hole and through it. The lynch pin or R-clip (not shown) may then be fitted through the transverse hole 30 for securing the safety pin in that position.

The distal tip 40 of the distal end 22*a* of the safety pin 20*a* is chamfered to assist with the insertion of the safety pin 20*a* through the holes (36).

The hole 36 is a round hole. However, a locking plate 42 is fastened to the coupler 10 over a sector of the hole 36 by two bolts 44. By covering the sector of the hole 36, the semi-cylindrical shaft 24*a* will fit in the hole in only one orientation. This ensures that the flat surface of the shaft rests against the rear side of the latching hook.

The locking plate also serves a second, more significant purpose. It prevents the safety pin 20*a* from being removable from the hole 36. Upon retracting the safety pin 20*a* to the non-safe position, the shoulder 32 will engage the back of the locking plate, thereby resisting further outward movement of the safety pin 20*a*. However, since the locking plate 42 is only bolted to the coupler, the locking plate 42 can be removed to allow the safety pin 20*a* to be removed, for example for servicing.

The length of the distal end can also be made to be the same as the thickness of the side plate of the coupler at the hole. In this manner, the safety pin 20*a*, in its retracted, or non-safe, position, will be retracted sufficiently to not extend into the internal space of the coupler. It will therefore not be able to interfere with any of the operational parts of the coupler 10.

With the present invention, the safety pin remains attached to the coupler frame during accessory release, held secure by the locking plate. The present invention therefore eliminates the danger of safety pin loss.

Figure 3:
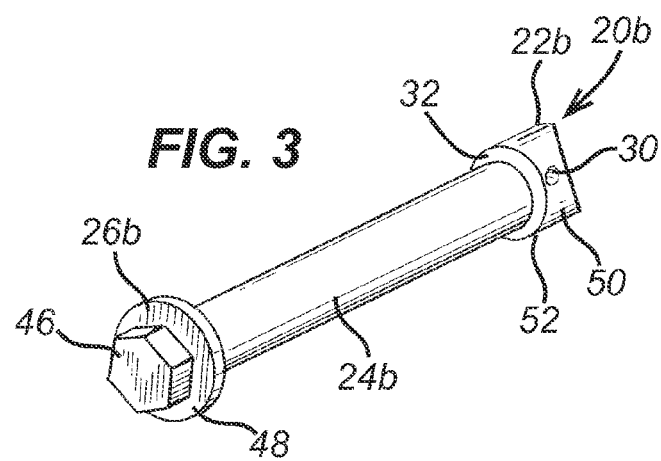
FIG. 3 is a perspective view of an alternative embodiment of safety pin.
Figure 4:
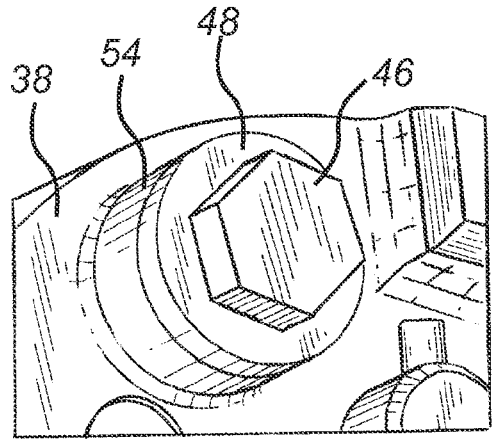
FIG. 4 is a perspective view of a head of the safety pin of FIG. 3 engaged against a boss of a coupler.
Figure 5:
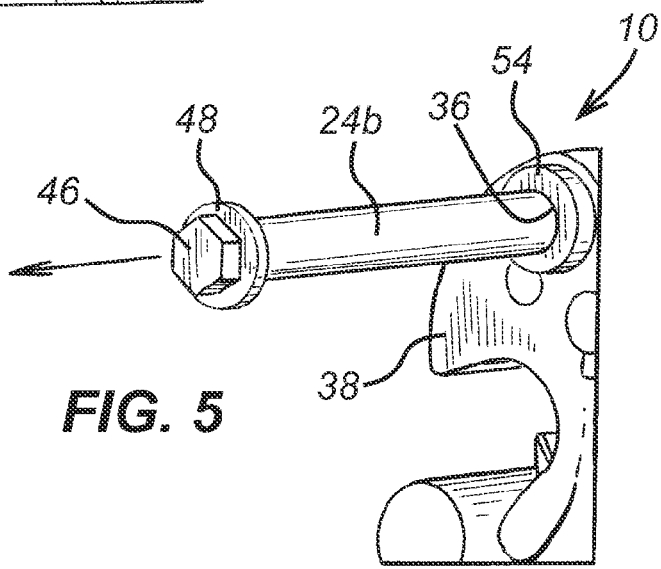
FIG. 5 shows the pin in the process of being removed.

Referring now to FIGS. 3, 4 and 5, a second embodiment of safety pin 20*b* is shown. It also comprises a head 26*b*, a shaft 24*b* and a distal end 22*b*. Further, the distal end has a transverse hole 30 there through for a lynch pin or R-clip. However, in this embodiment, the head 26*b* is removable from the shaft 24*b*.

The head 26*b* is a bolt 46 with an integral washer 48 and an integral shaft (not shown) that is screwed into the shaft 24*b* of the safety pin 20*b*.

The distal end 22*b* is integrally formed as a single piece with the shaft 24*b*. It has the transverse hole 30 drilled there-through. However, the distal end 22*b*, instead of being cylindrical, is now flattened. For example, it may be stamped to form two flat faces and two transversely extending sides. The two transversely extending sides extend radially outward relative to the shaft 24*b*.

The shaft is cylindrical along its length.

Figure 6:
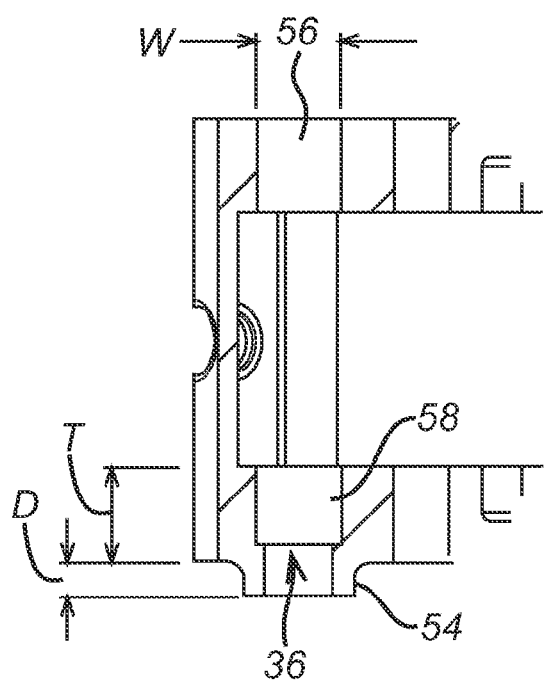
FIG. 6 shows a cross section through the coupler of the holes for receiving the pin of FIG. 3.

As shown in FIGS. 4 and 5, and similar to the first embodiment, the safety pin 20*b* is provided in a coupler 10 and it extends between two holes 36 in the side plates 38 of the coupler. However, the hole 36 is provided with a boss 54. The boss 54 provides a flat surface for the washer 48 to rest against. Further, it makes the side plate's thickness T thicker at that point by the depth D of the boss 54, as shown in FIG. 6. The additional thickness provides for a larger space for housing the distal end 22*b* of the safety pin 20*b* upon retracting the safety pin 20*b* into the non-safe position. Therefore, as before, prior to accessory release (or coupling), the safety pin is pulled from the coupler until it is retracted into the designed housing within the coupler frame to avoid any interference with the internal operating components of the coupler.

The housing 58 comprises a mortise that is centred over the first hole 36. It is larger in width than the hole—the housing receives the distal end 22*b*, whereas the hole 36 is sized to receive the shaft 24*b*, which is smaller than the distal end 22*b*.

In the retracted position, the shoulder 32 of the distal end 22*b* of the safety pin 20*b* bears against a shoulder 60 between the housing 58 and the hole 36. This prevents the removal of the safety pin.

The mortise may be round or shaped to accommodate the distal end in just one or more specific orientation (e.g. rectangular, star shaped, or otherwise).

FIG. 6 also shows the opposing hole 56. It has a similar width W to the housing 58 since it also is adapted to accommodate the distal end 22*b* of the safety pin 20*b*, but instead when the safety pin 20*b* has been inserted into its safe position. It also can be round or shaped to accommodate the distal end in just one or more specific orientation. This is useful, for example, since by using different rotational orientations and a non-concentric shaft or by having flat sides on the shaft that have different radial displacements relative to the longitudinal axis through the head and the distal end (as described later), different locking positions for the latching hook can be secured by the safety pin (multiple pin spacings).

Figure 7:
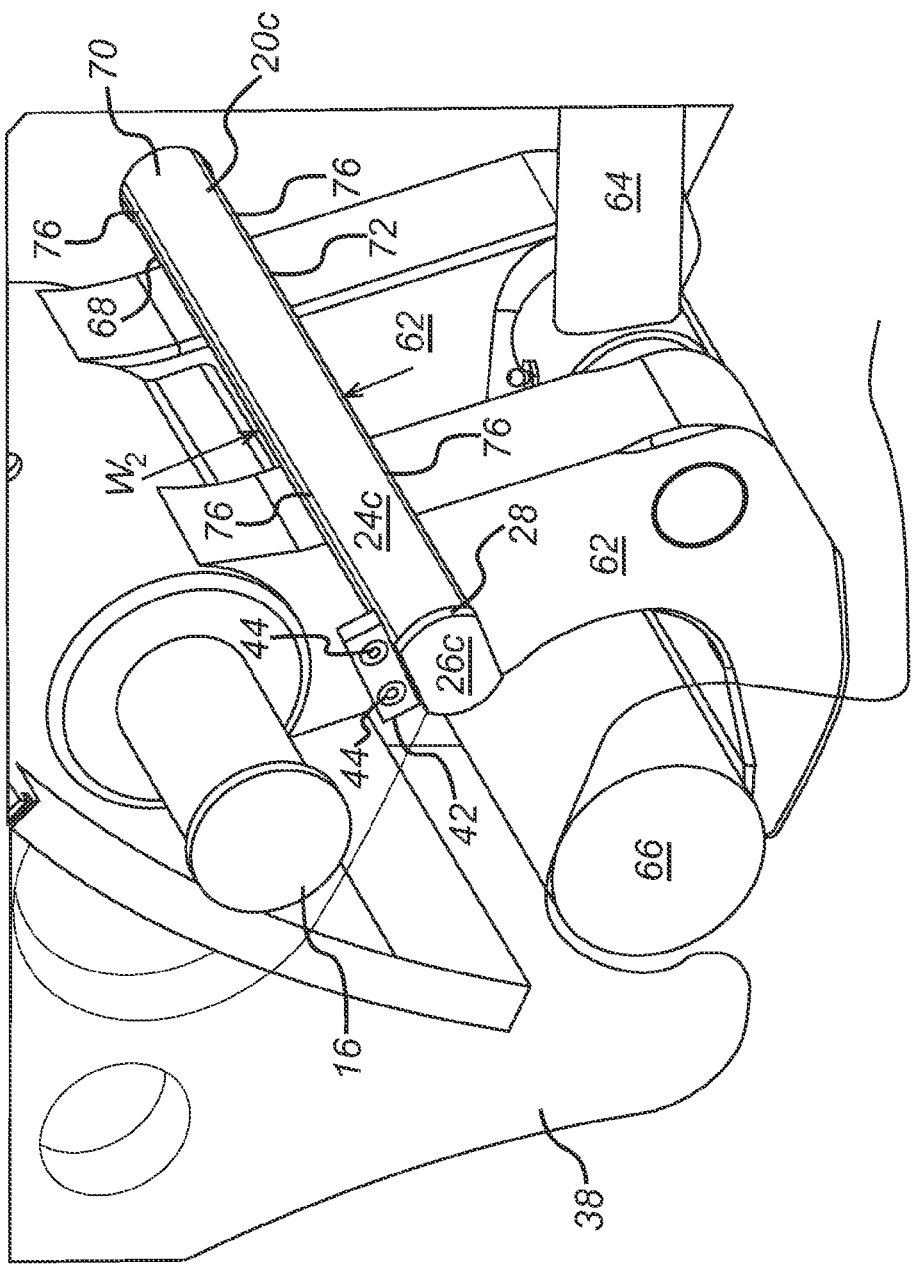
FIG. 7 shows a further embodiment of safety pin resting against latching hooks of a coupler.
Figure 8:
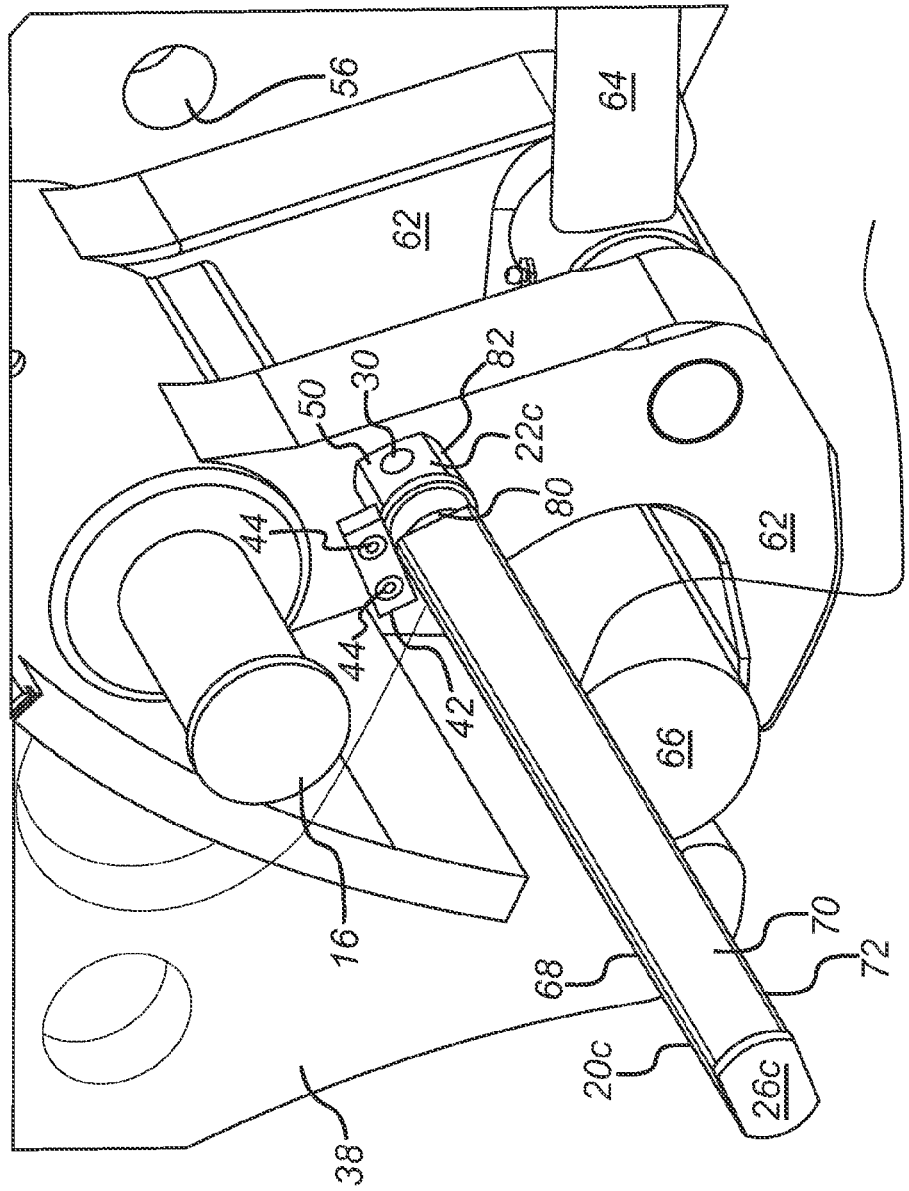
FIG. 8 shows the safety pin in its non-safe or retracted position—the latching hooks can be disengaged.
Figure 9:
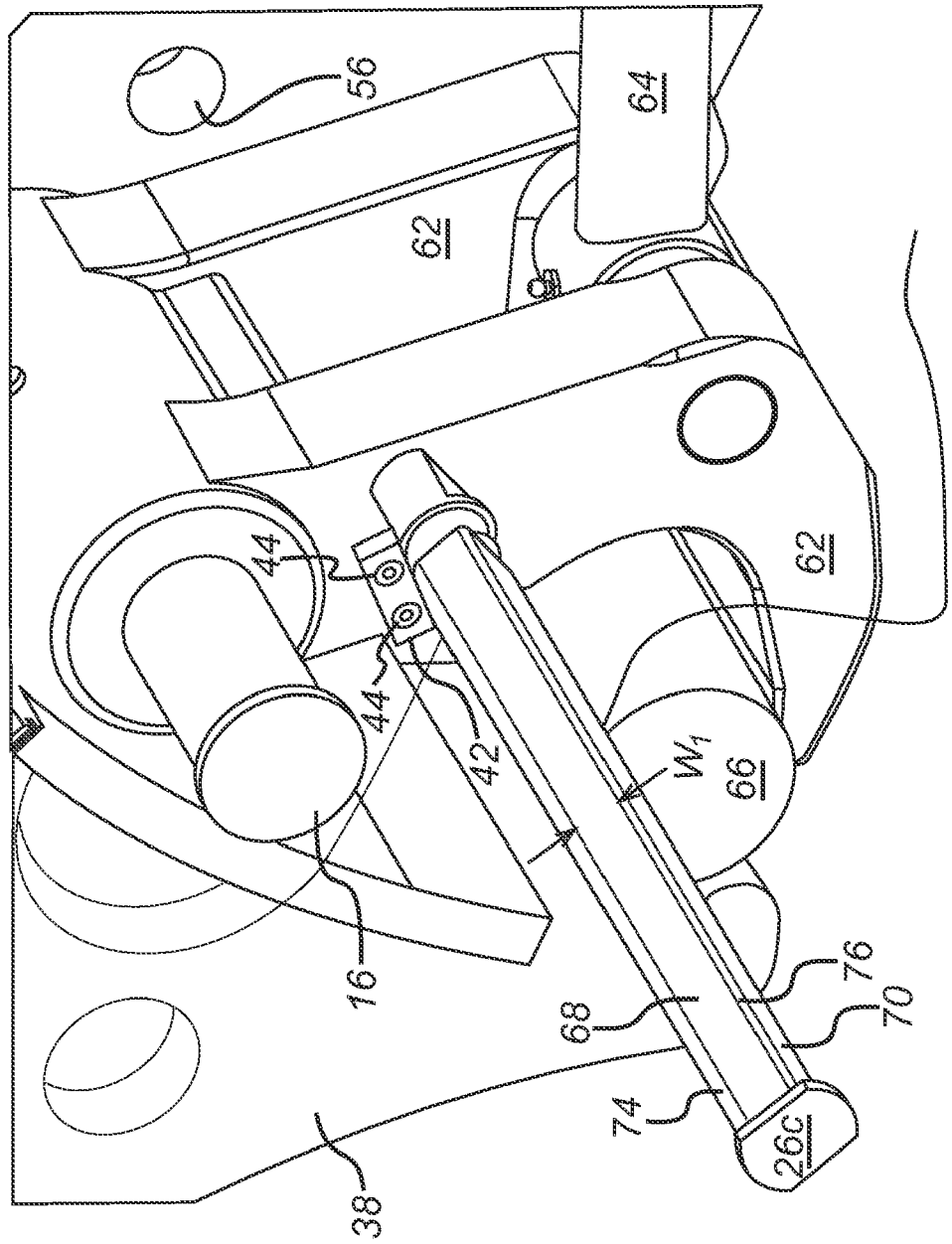
FIG. 9 shows the safety pin in a rotated position.

Referring now to FIGS. 7, 8 and 9, a final embodiment is shown. This cutaway perspective view generally omits the side plate 38 by making it transparent so that the latching hooks 62 can be seen.

The latching hooks 62 are moveable by a hydraulic piston 64. As shown, they engage a bucket pin 66. It is in this position that a safety pin 20c secures the latching hook.

The safety pin 20c in this embodiment again comprises a distal end 22c, a shaft 24c and a head 26c The head 26c comprises a flange 28 extending beyond the surface of the shaft 24c.

The distal end 22c comprises a transverse hole 30 for a lynch pin or R-clip, which hole extends between two flat faces 50. The distal end, however, also has a stepped down portion 80 with a smaller radius than the maximum radius of the shaft and the rest 82 of the distal end 22c (which two radiuses may be the same). This stepped down portion 80, as shown in FIG. 8, allows the safety pin 20c to rotate when withdrawn to the point at which the locking plate 42 aligns with the stepped down portion 80.

In this embodiment, the shaft 24c has three flat surfaces 68, 70, 72 and a fourth, rounded surface 74. The shaft has a substantially constant cross section along its full length. The interfaces between the adjacent surfaces may be rounded. They fall on the same inscribed circle as the rounded surface 74. In this manner, the shaft will readily slide in the two holes 36, 56 in the side plates—see the distal part of the safety pin in FIG. 7, where the interfaces touch the sides of the opposing hole 56. The rounded surface does as well.

A locking plate 42, as in the first embodiment, is provided. It also is attached by two bolts 44. It also covers a sector of the first hole 36. The sector, however, is less full. In use, i.e. when the safety pin 20c is inserted into the safe position, a side 78 of the locking plate 42 rests against one of the flat surfaces 68, 70, 72 of the shaft 24c.

As shown in FIG. 9, the first flat surface has a first width $W_1$. As shown in FIG. 7, the second flat surface 70 has a second width $W_2$. As a result, the centreline of those flat surfaces 68, 70 are radially displaced from the central longitudinal axis of the safety pin (which corresponds with the central axis of the holes and through the head and the distal end 22c of the safety pin), by different amounts. Further, the round surface is even further radially displaced than those surfaces. Therefore, by selectively orientating the safety pin while the pin is withdrawn to a non-safe position, which is possible in view of the stepped down portion 80, different securement positions for the latching hook can be achieved. This allows for multiple pin spacings to be catered for.

The safety pin is secured in its rotational orientation by the locking plate 42. In fact, the safety pin of this embodiment will only insert in three orientations, i.e. when a flat surface 68, 70, 72 faces the locking plate 42. In the orientation of FIG. 9, however, the distal end of the round surface 74 fouls against the locking plate 42, thereby preventing reinsertion of the safety pin 42. Similarly, if the safety pin 20c was to be oriented such that one of the two interfaces 76 was to point at the locking plate 42, the interface 76 instead would foul the locking plate 42. Therefore, the safety pin of this embodiment will only insert in three orientations, each one providing for a different bucket pin spacing.

The distal portion of the distal end prevents full removal of the safety pin since it has the same radius as the round surface.

Although a particular application for the safety pins has been described, it is anticipated that the safety pins of the present invention may also be used in other applications. For example, they may be used as the bucket pins, the accessory pins or as coupler pins, or for agricultural equipment needing safety pins.

The safety pins of the present invention may be referred to as non-removable safety pins since they cannot easily be removed.

The present invention has been described above purely by way of example. It should be noted that modifications in detail may be made within the scope of the invention.

The invention claimed is:

1. A system for retaining engagement of first and second elements within a coupler, the system comprising:
    a coupler having a sidewall and an aperture formed therethrough;
    a safety pin insertable into an aperture formed through a sidewall of the coupler, the safety pin comprising a head, a shaft depending from the head along a longitudinal axis, a distal end of the shaft opposite the head, and an element that extends radially outwardly from a portion of the shaft, the shaft, the distal end of the shaft and the element disposed in the aperture of the coupler; and
    a removable plate fixed to the sidewall of the coupler occluding a portion of the aperture corresponding substantially in size and shape with the element of the safety pin to prevent passage of the distal end of the safety pin through the aperture, wherein when the removable plate is fixed to the sidewall of the coupler the portion of the aperture not occluded by the removable plate is sized to allow passage of the shaft through the aperture.

2. The system of claim 1, wherein the element is formed by stamping the distal end to flatten and widen it.

3. The system of claim 1, wherein the distal end is integral with the shaft.

4. The system of claim 1, wherein the shaft is substantially cylindrical.

5. The system of claim 1, wherein the shaft has one or more flat sides.

6. A system for retaining engagement of first and second elements within a coupler, the system comprising:
    a coupler having a sidewall and an aperture formed therethrough, the aperture having an aperture axis;
    a safety pin comprising a head, a shaft depending from the head along a longitudinal axis, a distal end of the shaft opposite the head, and an element that extends radially outwardly from a portion of the shaft, the shaft, the distal end of the shaft and the element disposed in the aperture of the coupler with the longitudinal axis substantially aligned with the aperture axis; and
    a removable plate selectively fixed to the sidewall of the coupler occluding a portion of the aperture corresponding substantially in size and shape with the element of the safety pin to prevent passage of the distal end of the safety pin through the aperture, wherein when the removable plate is fixed to the sidewall of the coupler the portion of the aperture not occluded by the removable plate is sized to allow passage of the shaft through the aperture when the safety pin is moved in a direction corresponding to the aperture axis and the longitudinal axis, and wherein the shaft, the distal end and the element are removable through the aperture when the plate is removed.

7. The system of claim 6, wherein the element is formed by stamping the distal end to flatten and widen it.

8. The system of claim 6, wherein the distal end is integral with the shaft.

9. The system of claim 6, wherein the shaft is substantially cylindrical.

10. The system of claim 6, wherein the shaft has one or more flat sides.

11. A system for retaining engagement of first and second elements within a coupler, the system comprising:

a coupler having a sidewall and a circular aperture formed therthrough;

a safety pin inserted into the circular aperture, the safety pin comprising a head, a shaft depending from the head along a longitudinal axis, and a distal end of the shaft opposite the head, the shaft having a flat formed thereon comprising a plane substantially parallel to the longitudinal axis and the distal end being substantially cylindrical, the shaft and the distal end being sized for insertion into the circular aperture of the coupler; and a plate removably fixed to the sidewall of the coupler occluding a portion of the aperture, the portion of the aperture not occluded by the plate corresponding substantially in size and shape with a cross-section of the shaft of the safety pin, the safety pin being translatable along the longitudinal axis within the aperture with the plate preventing passage of the distal end of the safety pin through the aperture.

12. The system of claim 11, wherein the shaft is semi-cylindrical with the flat formed through the longitudinal axis, and wherein the plate is removably fixed to the sidewall of the coupler to occlude substantially half of the circular aperture.

* * * * *